Aug. 28, 1962 W. G. LIND 3,051,887
ALTERNATOR PROTECTIVE CIRCUIT
Filed May 8, 1961
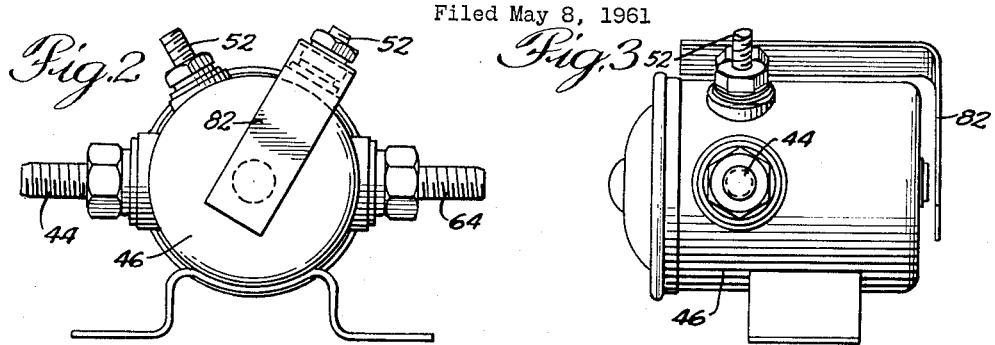
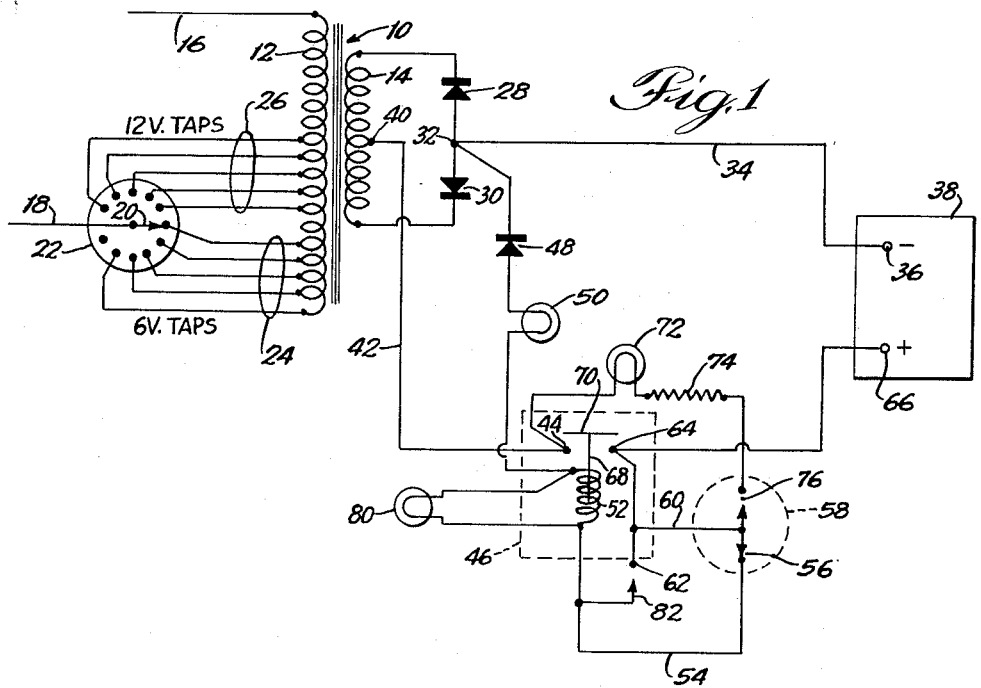
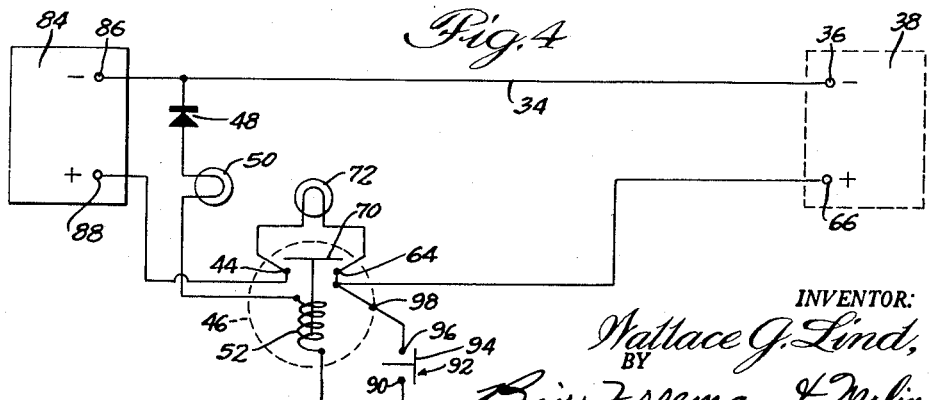
INVENTOR:
Wallace G. Lind,
BY
Bair, Freeman & Molinare
ATTORNEYS.

3,051,887
ALTERNATOR PROTECTIVE CIRCUIT
Wallace G. Lind, Minneapolis, Minn., assignor to Franklin Manufacturing Company, a corporation of Delaware
Filed May 8, 1961, Ser. No. 108,554
10 Claims. (Cl. 320—25)

This invention relates generally to electric circuit protective devices, and more particularly to a new and improved protective device having use with circuits for connecting battery chargers or booster batteries to the batteries of automobiles having alternator-rectifier systems.

In many present-day automobiles, the conventional generator of the automotive electrical system has been replaced by an alternator-silicon diode rectifier arrangement. Those skilled in the art appreciate that if either a battery charger or a booster battery is connected in reverse polarity to such alternator-rectifier systems—i.e., negative to positive and positive to negative—a reversal of the automotive electrical system results. Accordingly, such an error in the charging circuit wiring connections can cause the silicon diode rectifier to burn out, fail short and possibly short circuit and burn out the alternator and/or its associated wiring and controls.

Therefore, it is a general object of this invention to provide a new protective device for use in the battery charging circuits of alternator-rectifier automotive systems.

It is a more particular object of this invention to provide a new and improved battery charging circuit having unique safety features for protecting an automotive electrical system against damage in the event the battery charging circuit is erroneously connected in reverse polarity.

It is another object of this invention to provide a new solenoid operated battery charging circuit having current limiting means to allow a small amount of charge to go into a dead battery to the point where sufficient voltage is provided by the latter to supply operating power to the solenoid. In the event the charging circuit is connected in reverse polarity, the current limiting means limits the amount of reverse current flow to a value which can easily be dissipated without harm to the automotive alternator-rectifier system.

It is still another object of this invention to provide a solenoid operated battery charging circuit, as described, wherein the current limiting means takes the form of a ballast lamp connected across the solenoid contacts which serves to limit reverse current flow in the event the solenoid is not operated due to an erroneous wiring connection of reverse polarity.

It is a further object of this invention to provide a new solenoid operated battery charging circuit having a steel strap connected at one end to the solenoid coil and having its other end freely suspended in spaced relationship to the solenoid case so that upon energization of the solenoid a sufficient magnetic field is created to attract the steel strap to the case and provide a hold circuit for the solenoid which is operative during the solenoid energization period.

It is a still further object of this invention to provide a solenoid operated battery charging circuit having a ballast lamp connected in series with the solenoid coil so that the solenoid will function without damage on both 6 volt and 12 volt automotive battery systems, the ballast lamp serving to permit a full six volts to be applied to the solenoid but having the characteristic of increased resistance when twelve volts is applied thereto to protect the solenoid coil.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawing in which:

FIGURE 1 is an electrical schematic diagram of an illustrative solenoid operated battery charging circuit embodying the invention as particularly used with a battery charger;

FIGURES 2 and 3 are end and side elevational views, respectively, of a solenoid case having a hold circuit steel strap attached thereto in accordance with the invention; and FIGURE 4 is an electrical schematic diagram of an alternative embodiment of solenoid operated battery charging circuits embodying the invention as particularly used with a booster battery.

Referring now to the drawing, and more particularly to FIGURE 1 thereof, there is shown one illustrative embodiment of a battery charging circuit having polarity protection in accordance with the invention. Those skilled in the art will appreciate that the invention may be used with either battery chargers or booster batteries and, towards this end, two different embodiments of the invention adapted for use with each type of charging apparatus are disclosed and described herein. The illustrative circuit of FIGURE 1 is primarily adapted for use with a battery charger of any suitable type well-known in the art.

As shown in FIGURE 1, the circuit comprises a transformer 10 having a primary winding 12 and a secondary winding 14. The A.C. power input to the transformer 10 is supplied over the power leads 16 and 18, with the latter being connected to the movable contact 20 of a multi-position selector switch 22. The primary winding 12 of transformer 10 is provided with a plurality of taps, with the taps 24 being adapted for six volt operation and the taps 26 being adapted for twelve volt operation to enable the battery charging circuit to be used with either 6 volt or 12 volt batteries.

The secondary winding 14 of transformer 10 is connected to a full wave rectifier circuit comprising the diodes 28 and 30, connected back to back and having their junction 32 connected by means of the conductor 34 to an electrode terminal 36 of the battery to be charged 38. The center tap 40 of secondary winding 14 is connected by the conductor 42 to a stationary contact 44 of a solenoid within the solenoid case 46.

In accordance with a feature of this invention, the rectifier output at the junction point 32 is connected through a suitable unilateral impedance, such as the rectifier 48, and a ballast resistance 50 to one side of the solenoid coil 52. The other side of the solenoid coil 52 is connected through conductor 54 to the normally closed contacts 56 of a single pole, double throw momentary contact switch 58. The normally closed contacts 56 are connected by the conductor 60 to the solenoid case 46, as shown at 62, to the stationary contact 64 of the solenoid and to the other terminal 66 of the battery to be charged 38.

The solenoid coil 52 is operatively associated with the armature 68 which carries an armature contact 70 adapted to close a circuit between the sationary contacts 44 and 64 upon energization of the solenoid coil 52. In addition, the stationary solenoid contact 44 is connected through a ballast resistance 72 and a voltage limiting resistance 74 to the normally open contacts 76 of the switch 58. If desired, a conventional indicating lamp 80 can be connected across the solenoid coil 52 to be lighted only when the batteries to be charged 38 are correctly connected, have sufficient voltage to light the lamp 80 and when the contacts between the battery and the charger are clean and electrically sound.

In the operation of the circuit shown in FIGURE 1, when connected as shown, the solenoid coil 52 is in circuit with the rectifier 48 and ballast resistance 50 across the terminals 36 and 66 of battery 38. If the battery 38 is a dead, good battery, and if the charging circuit is correctly connected, the battery can be brought to a voltage point where it will energize the solenoid coil 52 within a maximum of several minutes. Under ordinary conditions of extremely low charge for the battery 38, this time period is in the order of less than one minute, and in one particular embodiment of the invention successfully constructed and tested, this time period was in the order of 10 to 15 seconds. Thus, when the momentary contact switch 58 is operated to close the normally open contacts 76 and to open the normally closed contacts 56, a circuit is completed from the center tap 40 of secondary winding 14 in transformer 10 through the ballast resistance 72 and resistance 74 to the battery terminal 66 to apply the output of the battery charger to the battery 38. As stated above, the switch 58 need be held closed only for several minutes if the battery 38 is a good, dead battery to bring the latter to a voltage point sufficient to energize solenoid coil 52 upon release of the switch 58. If the battery 38 has an extremely low charge condition, then the switch 58 need be held closed for only a matter of seconds to accomplish this result. However, in accordance with a feature of this invention, should the battery charger be connected in reverse polarity to the battery 38, then the switch 58 must be held closed at least for thirty minutes or more before sufficient reverse charge can be put into the battery 38 to produce reverse operation. Since the length of this time period is far beyond the normal operating requirements of the charge circuit, the operator will have released the switch long before this time and the reverse charge cannot take place to adversely affect the automobile alternator-rectifier system.

Thus, those skilled in the art can now appreciate that the rectifier 48 serves to provide current flow in only one direction through the solenoid coil 52. The ballast resistance 50 may take the form of a ballast lamp which, due to its positive temperature co-efficient characteristics, permits the use of a 6 volt solenoid coil with either 6 volt or 12 volt batteries. In the case of a 12 volt battery, the resistance of the ballast lamp 50 increases sufficiently to prevent any damage to the 6 volt solenoid coil 52.

The purpose of the circuit comprising ballast lamp 72 and resistance 74 is to allow a small amount of charge to go into a dead battery to the point where sufficient voltage is generated to provide operative power to the solenoid coil 52 when the correct polarity is observed with respect to the rectifier 48. It will be noted that this ballast lamp and resistance combination jumpers the open solenoid contacts 44 and 64 when the switch 58 is actuated to close the normally open contacts 76. The amount of charge permitted to go into the battery 38 by this combination upon actuation of switch 58 is so small—normally less than one ampere—that even if a reversal of polarity is made by the operator in connecting the circuit, the ballast lamp 72 and resistance 74 limits the current to a point where only about 400 milliamperes are available for reverse current flow in the automobile alternator-rectifier system. Those skilled in the art will appreciate that such a small value of reverse current flow can easily be dissipated without harm to the alternator-rectifier system.

The solenoid may take the form of any conventional, low cost, insulated coil, 6 volt automotive type solenoid. When the momentary contact switch 58 is actuated, as will be necessary to put the ballast lamp 72 and resistance 74 into operation, the solenoid coil 52 is taken out of the circuit by the opening of the contacts 56. This is done to prevent the solenoid circuit from locking-in on the power provided by the battery charger itself. A second reason for opening the circuit to the solenoid coil 52 is to reduce the power required through the ballast lamp 72 and resistance 74 combination which would otherwise supply current to the solenoid coil 52 and the battery 38 in parallel.

In accordance with a particular feature of this invention, the solenoid coil 52 is provided with a hold circuit in the form of a plated spring steel strap 82. As better shown in FIGURES 2 and 3 of the drawing, the steel strap 82 may be in the form of a half-loop with one end connected to a terminal of the solenoid coil 52 and with the other end suspended free in spaced relation to the solenoid case 46. When the solenoid coil 52 is energized a sufficient magnetic field is produced to attract the steel strap 82 so that it makes contact with the solenoid case 46. Such contact is held so long as normal current flows through the solenoid coil 52 to maintain the latter energized. This contact, in effect, parallels the normally closed contacts 56 of switch 58 to provide a hold circuit for the solenoid. Thus, when the battery 38 is being charged normally at a relatively high charging rate, the operator will not be able to break the circuit to the solenoid coil 52 and allow the solenoid contacts to open a high current circuit, the latter not being conducive to long contact life.

The resistance 74 in circuit with the ballast lamp 72 is provided to prolong the life of ballast lamp 72. With a battery charger having its transformer tap set at maximum output and with a 12 volt battery connected in reverse, it is theoretically possible to place 28 volts across the ballast lamp 72. While the lamp will act effectively, its useful life under such conditions will be shortened. The resistance 74 serves to hold the voltage across ballast lamp 72 under a reasonable point from the life standpoint without harming the lamp's controlling effect on the battery charging operation.

An alternative embodiment of the invention particularly adapted for use with booster batteries is shown in FIGURE 4 of the drawing. The operation of this circuit embodiment is similar to that of the circuit described hereinabove and therefore, this alternative embodiment has been shown in simplified form to facilitate the explanation thereof.

Thus, a booster battery 84 is shown with its electrode terminal 86 connected through the conductor 34 to an electrode terminal 36 of the battery to be charged 38. The other electrode terminal 88 of booster battery 84 is connected to the solenoid contact 44. When the solenoid coil 52 is not energized and the solenoid contacts 44 and 64 are open, these contacts are bridged by a ballast lamp 72 such that the booster battery is connected to the battery to be charged through the ballast lamp 72.

The booster battery electrode terminal 86 is connected through a rectifier 48 and ballast lamp 50 to one side of the solenoid coil 52. The other side of the solenoid coil 52 is connected to the stationary contact 90 of a normally open momentary contact push button switch 92 having a push button contact 94 and another stationary contact 96. Contact 96 of switch 92 is connected to a solenoid contact 64 and also to the solenoid case 46, as indicated at 98.

In the operation of this embodiment of the invention, closing of the push button switch 92 places the solenoid coil 52 in series with rectifier 48 and ballast lamp 50 across the battery 38. If there is sufficient charge in battery 38 to energize the solenoid coil 52, the solenoid contact 70 closes the solenoid contacts 44 and 64 to short circuit the ballast lamp 72 and to place the battery 38 directly across the output of the battery 84. Thus, the booster battery 84 is directly connected to the battery 38 as long as the push button switch 92 is held closed to cause the battery 38 to be charged, as desired.

While there has been shown and described a specific embodiment of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. The improvement of a battery charging circuit comprising the combination of a pair of power terminals connected to a source of battery charging voltage, a solenoid case having positioned therein a solenoid coil, an armature and a pair of solenoid contacts in circuit making and breaking association with said armature, circuit means comprising a unilateral impedance in series with a ballast resistance connected between one power terminal and said solenoid coil, conductor means connecting said one power terminal to an electrode of the battery to be charged, conductor means connecting the other power terminal to one of said solenoid contacts, conductor means connecting the other solenoid contact to another electrode of the battery to be charged, switching means connecting the solenoid coil to said another solenoid contact, and a steel strap connected at one end to the solenoid coil and having its other end suspended in spaced relation to said solenoid case whereby energization of said solenoid coil creates a magnetic field sufficient to attract said steel strap in contacting engagement with the solenoid case to provide a hold circuit for said solenoid.

2. The improvement of a battery charging circuit comprising the combination of a pair of power terminals connected to a source of battery charging voltage, a solenoid case having positioned therein a solenoid coil, an armature and a pair of solenoid contacts in circuit making and breaking association with said armature, circuit means comprising a unilateral impedance in series with a ballast resistance connected between one power terminal and said solenoid coil, conductor means connecting said one power terminal to an electrode of the battery to be charged, conductor means connecting the other power terminal to one of said solenoid contacts, conductor means connecting the other solenoid contact to another electrode of the battery to be charged, switching means connecting the solenoid coil to said other solenoid contact, and further switching means connected at one end to the solenoid coil and having its other end in spaced relation to said solenoid case whereby energization of said solenoid coil creates a magnetic field sufficient to attract said further switching means in contacting engagement with the solenoid case to provide a hold circuit for said solenoid.

3. The improvement of a battery charging circuit comprising the combination of a pair of power terminals connected to a source of battery charging voltage, a solenoid case having positioned therein a solenoid coil, an armature and a pair of solenoid contacts in circuit making and breaking association with said armature, circuit means comprising a unilateral impedance in series with a ballast resistance connected between one power terminal and said solenoid coil, conductor means connecting said one power terminal to an electrode of the battery to be charged, conductor means connecting the other power terminal to one of said solenoid contacts, conductor means connecting the other solenoid contact to another electrode of the battery to be charged, and selectively operable switching means for connecting the solenoid coil to said other solenoid contact to complete the energizing circuit for said solenoid coil.

4. The improvement of a battery charging circuit comprising the combination of a pair of power terminals connected to a source of battery charging voltage, a solenoid including a solenoid coil, an armature and a pair of solenoid contacts in circuit making and breaking association with said armature, circuit means comprising a unilateral impedance in series with a resistance having a positive temperature coefficient characteristic connected between one power terminal and said solenoid coil, conductor means connecting said one power terminal to an electrode of the battery to be charged, conductor means connecting the other power terminal to one of said solenoid contacts, conductor means connecting the other solenoid contact to another electrode of the battery to be charged, and manually actuatable switching means for connecting the solenoid coil to said other solenoid contact to complete an energizing circuit for said solenoid coil.

5. The improvement of a battery charging circuit in accordance with claim 4 further comprising additional ballast resistance means connected across said pair of solenoid contacts.

6. The improvement of a battery charging circuit in accordance with claim 4 further comprising additional ballast resistance means, and circuit means connecting said additional ballast resistance means between one of said solenoid contacts and said manually actuatable switching means.

7. The improvement of a battery charging circuit in accordance with claim 6 further comprising a hold circuit including a switch element operable in response to the energization of said solenoid coil for providing a circuit path in parallel to said manually actuatable switching means to maintain said solenoid coil energized after release of said manually actuatable switching means.

8. The improvement of a battery charging circuit comprising the combination of a pair of power terminals connected to a source of battery charging voltage, a solenoid case having positioned therein a solenoid coil, an armature and a pair of solenoid contacts in circuit making and breaking association with said armature, circuit means comprising a rectifier in series with a first ballast resistance connected between one power terminal and said solenoid coil, conductor means connecting said one power terminal to an electrode of the battery to be charged, conductor means connecting the other power terminal to one of said solenoid contacts, conductor means connecting the other solenoid contact to another electrode of the battery to be charged, and manually actuatable switching means having normally open and normally closed contacts, said normally closed contacts connecting the solenoid coil to said other solenoid contact, and said normally open contacts, upon being closed by the actuation of said manually actuatable switching means, serving to connect said one solenoid contact to said other solenoid contact to apply power from the battery charging source to the battery to be charged.

9. The improvement of a battery charging circuit in accordance with claim 8 further comprising second ballast resistance means connected between said one solenoid contact and the normally open contacts of said manually actuatable switching means.

10. The improvement of a battery charging circuit in accordance with claim 9 further comprising a steel strap connected at one end to the solenoid coil and having its other end suspended in spaced relation to said solenoid case whereby energization of said solenoid coil creates a magnetic field sufficient to attract said steel strap in contacting engagement with the solenoid case to provide a hold circuit for said solenoid in parallel with the normally closed contacts of said manually actuatable switching means.

References Cited in the file of this patent
UNITED STATES PATENTS

| | | |
|---|---|---|
| 2,155,229 | Hoffman | Apr. 18, 1939 |
| 2,509,239 | Mattheyses | May 30, 1950 |
| 2,683,850 | Weber et al. | July 13, 1954 |
| 2,693,566 | Hooper | Nov. 2, 1954 |